2,999,087
POLYMERIZATION OF PIPERYLENE

Robert M. Thomas, Westfield, Lawrence T. Eby, Linden, and Charles W. Seelbach, Cranford, N.J., assignors to Esso Research and Engineering Company, a corporation of Delaware
No Drawing. Filed Apr. 13, 1956, Ser. No. 577,930
2 Claims. (Cl. 260—94.3)

This invention relates to the polymerization of piperylene and to the novel polypiperylene product obtained.

Piperylene is a normal straight chain diolefin, specifically 1,3 pentadiene, having the formula $$CH_2=CH-CH=CH-CH_3$$

The structure of the three simplest diolefins namely butadiene, isoprene and piperylene, has certain features in common, but also some very important differences. For instance, all three of these diolefins can be represented by the general formula $CH_2=CH-CA=CH-B$. In the case of butadiene both A and B are hydrogen atoms. In the case of isoprene A is a methyl group $CH_3$, and B is hydrogen. In the case of piperylene A is hydrogen and B is a methyl ($CH_3$). The nature and position of these hydrogen and methyl groups makes a tremendous difference in the polymerizability of these diolefins under various conditions of temperature and catalyst influence. Thus, for instance, butadiene polmerizes quite readily by emulsion polymerization with a peroxy type catalyst at 20 to 50° C., but neither isoprene nor piperylene gives good results with that process.

Some attempts have been made to polymerize these diolefins by contacting with a finely dispersed solid catalyst which is prepared by reducing or complexing a reducible compound of a transition metal of groups IV, V, VI and VIII of the periodic table, e.g. $TiCl_4$, with a metallo organic reducing agent, e.g. aluminum triethyl, but it appears that conditions which give fairly good polymerization results with one diolefin may give poor results or no polymer at all with other diolefins. It has been difficult heretofore to get good polypiperylene of high molecular weight by the use of this type of catalyst, but it has now been discovered how this can be accomplished.

According to the present invention, one of the important features is the preparation of the catalyst to obtain an Al/Ti molar ratio of about 2.5–3.5, preferably about 3.0.

In preparing the catalyst, the reducible heavy metal compound to be used should preferably be a compound of a metal of groups IV(b), V(b), VI(b) and VIII of the periodic table, including the metals, Ti, Zr, Hf, B, Nb, Ta, Cr, Mo, and W. The metal compounds to be used may be of various types such as halides, e.g. chloride, bromides, etc., acetyl acetonates, hydrated oxides, alcoholates, etc., or compounds containing 1 or more of several of these different types of radicals.

The metallo organic reducing agent to be used is preferably an alkyl compound of a metal of groups II or III of the periodic table such as aluminum trialkyls containing 1 to 20 carbon atoms in the alkyl groups, or compounds of the general formula $AlR_2X$, in which X may be a halogen, e.g. chlorine, bromine, etc., or a secondary amine, acid amide, mercaptan, thiophenol, carboxylic acid, etc.; or it may be a zinc or magnesium dialkyl or a monoalkyl monohalide, e.g. zinc diethyl, ethyl magnesium cholride, etc.; or it may be an alkali metal, e.g. sodium, or a sodium alloy, or sodium hydride, or a combination of such alkali metals with aluminum triethyl, etc.

A preferred catalyst is one made by complexing 2.5 to 3.5 moles of aluminum triethyl with one mole of $TiCl_4$.

A catalyst may be prepared by adding a solution of the aluminum alkyl in an inert diluent such as normal heptane, to a solution of $TiCl_4$, likewise preferably dissolved in some of the same inert solvents, e.g. normal heptane. Generally, the resulting catalyst complex forms as an insoluble precipitate, and is preferably kept in a state of fine dispersion by suitable agitation. The preparation of the catalyst and subsequent use in the polymerization, are preferably all carried out in the absence of oxygen or moisture or other harmful impurities, and this may be accomplished satisfactorily by blanketing the reacted materials with dry nitrogen throughout the entire process.

When ready for polymerization, the catalyst dispersion inert diluent, preferably having a catalyst concentration of about 0.1 to 50 grams per liter, is placed in the polymerization reactor, and the piperylene is added, either in the liquid or vapor phase. The reactor is preferably maintained under a pressure, e.g. by nitrogen pressuring, of about 300 to 1000 p.s.i.g., preferably about 400 to 800 p.s.i.g., and the temperature should be raised from a room temperature of 20° C. to a polymerization reaction temperature in the range from about 60 to 100° C., preferably about 70 to 90° C. The reaction time will depend somewhat on the other variables, but generally will be in the range of about 20 hours to 150 hours, preferably from about 50 to 100 hours.

During polymerization, the polymer forms as a slurry of finely divided solid polymer particles suspended in the inert diluent. After polymerization, the solid polymer may be recovered from the inert diluent, preferably by first adding isopropanol or other suitable material to deactivate the catalyst, and then filtering the slurry, and washing the solid residue with isopropanol to remove any additional residual catalyst. If desired, this solid polymer may also be washed with a suitable solution of a chelating agent such as acetonyl acetone dissolved in either isopropanol and/or normal heptane, etc. After washing the polymer, it may be dried, e.g. in a vacuum oven, and the product, which is high molecular weight solid polypiperylene may then be weighed and evaluated. This particular portion of the piperylene polymerization product is believed to contain a relatively larger proportion of crystalline type polymer molecules.

Another fraction of polymerized piperylene, only slightly lower in molecular weight, but having a softer, tackier physical texture, can be obtained by evaporation of the filtrate, which consists essentially of the major proportion of the normal heptane diluent used during the reaction, together with the small amount of isopropanol which has been added to deactivate the catalyst, and together with the heptane-soluble portion of polypiperylene, and some deactivated residual catalyst. After evaporation of the heptane, the residual polymer may be further washed with isopropanol if desired, and finally dried in a vacuum oven. The heptane-soluble polypiperylene thus recovered, appears to be slightly more branched than the above described heptane-insoluble fraction, and also has a higher unsaturation.

Although the exact mechanism of the invention is not well understood, it is believed that the particular chemical structure of the piperylene, which may be termed a substituted butadiene-1,3 with a hydrogen atom on the third carbon atom and a methyl group on the fourth carbon atom, in some way cooperates with the specially prepared catalyst having an Al/Ti molar ratio of 3.0, to give the successful polymerization of the piperylene.

The details and advantages of the invention will be better understood from the consideration of the following experimental data.

Example

Piperylene (22% cis), 30 grams, is charged to a previous evacuated one liter gas holder in a dry nitrogen atmosphere. Dry n-heptane (85 ml.) is added. This piperylene solution is transferred to a feed reservoir bomb with nitrogen pressure.

The catalyst is prepared in a dry nitrogen atmosphere by adding 1 ml. of 0.834 M $TiCl_4$, containing 0.16 g. of $TiCl_4$, to 4 ml. of dry n-heptane in a 10 ml. graduate. Three ml. of 0.876 M $AlEt_3$, containing 0.3 g. of $AlEt_3$, in dry n-heptane is added and the slurry made up to a total volume of 10 ml. After 5 min. at room temperature the catalyst slurry is added to a 300 ml. Aminco microbomb and is rinsed in with an additional 5 ml. of n-heptane. After sealing the bomb in a dry nitrogen atmosphere it is placed in a rocker and connected to the feed reservoir. The piperylene-heptane mixture is pressured into the bomb with 400 p.s.i.g. of nitrogen and the rocker is started. The gas holder is evacuated, 100 ml. n-heptane added in a dry nitrogen atmosphere, the heptane transferred to the feed reservoir and pressured into the reactor with 620 p.s.i.g., nitrogen to rinse in the piperylene. Then the bomb is heated to 82° C. for 94 hours. The pressure increases to 760 p.s.i.g.

The bomb is cooled, opened and 100 ml. of isopropanol added to deactivate excess catalyst. The polymer slurry is filtered and the solid washed with isopropanol. The filtrate is evaporated on the steam bath. The dry solid weighs 6 grams and the heptane-soluble polymer recovered from the filtrate weighs 15 grams, making a total yield of 70%. Thus the catalyst efficiency is 33 gms./gm. total catalyst. The intrinsic viscosity of the solid is .642 which is equivalent to a molecular weight of 12,500 on the Harris scale for polyethylene. Similarly the greaselike polymer has an intrinsic viscosity of .631 equivalent to a molecular weight of 10,500.

Although both fractions of the above-described polypiperylene are slightly cross-linked as indicated by melting point behavior and partial solubility in carbon tetrachloride, there is considerable residual unsaturation. The tacky heptane-insoluble solid (29%) (mol. wt.—Harris—12,500) softens at 80° C. and has an unsaturation value of 116.3 cg. I/gm.; and the heptane-soluble greaselike fraction (71%) (mol. wt.—Harris—10,500) has a value of 204 cg. I/gm. The theoretical value for a polymer containing one double bond per piperylene unit is approximately 292 cg. I/gm. Approximately 61% of the unsaturation predicted on this basis is accounted for by the experimental unsaturation values. Polypiperylene having a Harris molecular weight of at least about 5,000, generally in the range of 10,000 to 15,000, and having an unsaturation value of above about 100 cg. of iodine per gram, generally in the range of 200 to 250 cg. of iodine per gram, is produced by the process of the invention.

These are considerably better molecular weight and unsaturation values than obtained by prior catalysts and processes.

It is not intended that this invention be limited to the specific modifications which have been given merely for the sake of illustration but only by the appended claims in which it is intended to claim all novelty inherent in the invention as well as all modifications coming within the scope and spirit of the invention.

What is claimed is:

1. A process for making solid polypiperylene having a Harris molecular weight of about 10,000 to 15,000 and an unsaturation of about 200 to 250 cg. of iodine per gram, which comprises contacting piperylene with a catalyst obtained by mixing titanium tetrachloride with an aluminum trialkyl of 1 to 20 carbon atoms in the alkyl groups in a ratio of about 3 moles of the aluminum trialkyl per mole of titanium tetrachloride, at a polymerization temperature of about 60° to 100° C. and a pressure of about 300 to 1000 p.s.i.g. in an inert diluent.

2. A process for making solid polypiperylene having a Harris molecular weight of about 10,000 to 15,000 and an unsaturation value in the range of about 100 to 250 cg. of iodine per gram, which comprises polymerizing piperylene in the presence of a catalyst complex of $TiCl_4$ and aluminum triethyl, using an Al/Ti molar ratio of about 3.0, at a polymerization temperature of about 70 to 90° C., under a pressure of about 400 to 800 p.s.i.g., in the presence of an inert diluent.

References Cited in the file of this patent

UNITED STATES PATENTS

| | | |
|---|---|---|
| 2,440,498 | Young et al. | Apr. 27, 1948 |
| 2,721,189 | Anderson et al. | Oct. 18, 1955 |
| 2,822,357 | Brebner et al. | Feb. 4, 1958 |
| 2,881,156 | Pilar | Apr. 7, 1959 |
| 2,882,264 | Barnes et al. | Apr. 14, 1959 |

FOREIGN PATENTS

| | | |
|---|---|---|
| 5,667 | Great Britain | Mar. 6, 1913 |
| 538,782 | Belgium | Dec. 6, 1955 |